United States Patent [19]
Massie et al.

[11] Patent Number: 6,144,115
[45] Date of Patent: Nov. 7, 2000

[54] POWER SHARE DISTRIBUTION SYSTEM AND METHOD

[75] Inventors: Harold L. Massie, W. Linn, Oreg.; Peter T. Villanueva, Olympia, Wash.

[73] Assignee: Intel Corporation, Santa Clara, Calif.

[21] Appl. No.: 09/181,080

[22] Filed: Oct. 27, 1998

[51] Int. Cl.⁷ ........................................... H02J 4/00
[52] U.S. Cl. ........................ 307/80; 307/81; 307/115; 307/52
[58] Field of Search ................... 307/80, 81, 43, 307/52, 53, 115

[56] References Cited

U.S. PATENT DOCUMENTS

| | | | |
|---|---|---|---|
| 4,101,787 | 7/1978 | Vail | 307/81 |
| 4,297,590 | 10/1981 | Vail | 307/43 |
| 4,841,161 | 6/1989 | Lentini et al. | 307/43 |
| 4,877,972 | 10/1989 | Sobhani et al. | 307/43 |
| 4,965,694 | 10/1990 | Dvorak et al. | 307/115 |
| 5,157,269 | 10/1992 | Jordan et al. | 307/53 |
| 5,420,497 | 5/1995 | Kimura et al. | 307/64 |
| 5,428,524 | 6/1995 | Massie . | |
| 5,455,501 | 10/1995 | Massie . | |
| 5,552,643 | 9/1996 | Morgan et al. | 307/81 |
| 5,587,650 | 12/1996 | Massie . | |
| 5,623,198 | 4/1997 | Massie et al. . | |
| 5,627,413 | 5/1997 | Mughir et al. . | |
| 5,650,715 | 7/1997 | Massie . | |
| 6,018,203 | 1/2000 | David et al. | 307/52 |

*Primary Examiner*—Josie Ballato
*Assistant Examiner*—Rios Roberto
*Attorney, Agent, or Firm*—Antonelli, Terry, Stout & Kraus, LLP

[57] ABSTRACT

A power share distribution system and method. Included are: a plurality of power supplies; an isolator provided for each power supply of the plurality of power supplies for selectively blocking/passing an output power from the power supply; and a controller controlling each isolator for passing an output power of each power supply for a predetermined time, such that different groups (including groups of 1) of the plurality of power supplies supply output power to a load at different times. In a preferred embodiment, the power supplies are more particularly current supplies. Further, in a preferred embodiment, the controller more specifically passes an output current of each current supply such that each current supply supplies current to the load for mutually exclusive times.

22 Claims, 4 Drawing Sheets

POWER SHARE DISTRIBUTION SYSTEM AND METHOD

BACKGROUND OF THE INVENTION

1. Field of the Invention

The present invention is generally directed to a power share distribution arrangement, and is more particularly directed to a current share distribution arrangement providing current share in multiple power supply applications (e.g., a computer server arrangement).

2. Description of Related Art

Numerous power supply arrangements are known in the art. For example, attention is directed to the following: U.S. Pat. No. 5,587,650; U.S. Pat. No. 5,627,413; U.S. Pat. No. 5,650,715; U.S. Pat. No. 5,623,198; U.S. Pat. No. 5,428,524; and, U.S. Pat. No. 5,455,501.

Problems with the related art is that such arrangements require complex circuitry, design and excessive components, and are subject to operational instabilities.

SUMMARY OF THE INVENTION

The present invention is directed to a unique and novel power supplying arrangement. More particularly, the present invention, in a first apparatus embodiment, is directed to a power share distribution system including: a plurality of power supplies; an isolator provided for each power supply of the plurality of power supplies for selectively blocking/passing an output power from the power supply; and a controller controlling each isolator for passing an output power of each power supply for a predetermined time, such that different groups of the plurality of power supplies supply output power to a load at different times.

A second embodiment is directed to a current share distribution system including: a plurality of current supplies; an isolator provided for each current supply of the plurality of current supplies for selectively blocking/passing an output current from the current supply; and a controller controlling each isolator for passing an output current of each current supply for a predetermined time, such that different groups of the plurality of current supplies supply output current to a load at different times.

Next, a third embodiment is directed to a current share distribution system including: at least three current supplies; an isolator provided for each current supply of the at least three current supplies for selectively blocking/passing an output current from the current supply; and a controller controlling each isolator for passing an output current of each current supply for a predetermined time, such that different groups of the at least three current supplies supply output current to a load at different times, wherein the controller more specifically monitors real-time enablement of each current supply of the at least three current supplies, and controls passage of the output current of each current supply such that total current delivery by the current share distribution system is divided and shared equally over time by a number of presently operative at least three current supplies.

Still further, another embodiment is directed to a computer server system including a current share distribution system, the current share distribution system including: at least three current supplies; an isolator provided for each current supply of the at least three current supplies for selectively blocking/passing an output current from the current supply; and a controller controlling each isolator for passing an output current of each current supply for a predetermined time, such that different groups of the at least three current supplies supply output current to a load at different times, wherein the controller more specifically monitors real-time enablement of each current supply of the at least three current supplies, and controls passage of the output current of each current supply such that total current delivery by the current share distribution system is divided and shared equally over time by a number of presently operative at least three current supplies.

Finally, a method embodiment is directed to a power share distribution method including the steps of: outputting power from a plurality of power supplies; providing an isolator for each power supply of the plurality of power supplies for selectively blocking/passing the power from the power supply; and controlling each isolator for passing an output power of each power supply for a predetermined time, such that different groups of the plurality of power supplies supply output power to a load at different times.

The foregoing and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWINGS

The following represent brief descriptions of the drawings, wherein.

DETAILED DESCRIPTION

Figure 1:
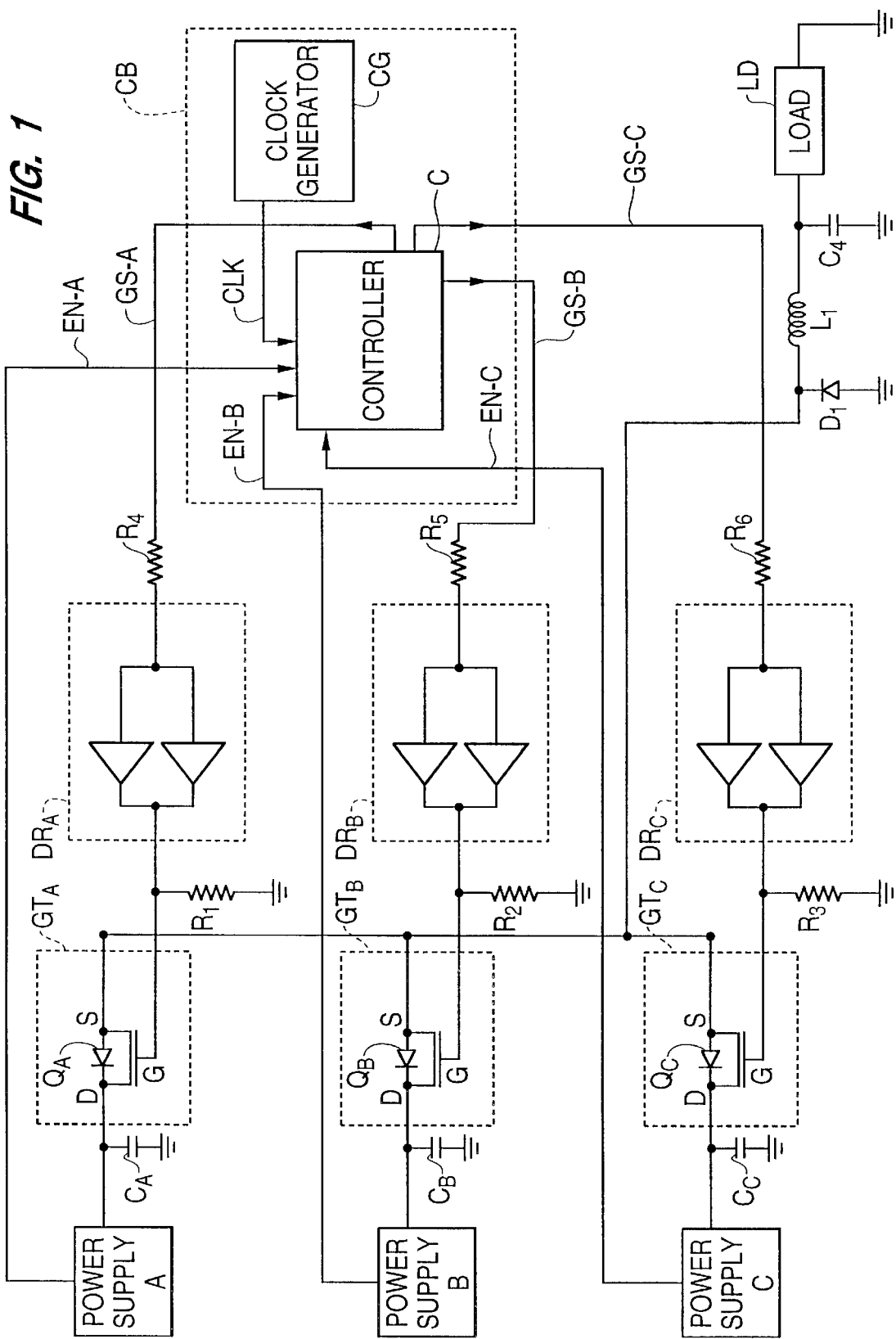
FIG. 1 is a circuit diagram of an exemplary embodiment of the present invention.

When appropriate, like reference numerals and characters are used to designate identical, corresponding or similar components in differing figure drawings. Further, in the detailed description to follow, exemplary component model numbers and/or component sizes/values are given in parenthesis, although the present invention is not limited to the same.

Turning now to a detailed description, FIG. 1 is a circuit diagram of an exemplary embodiment of the present invention. More particularly, illustrated are three power supplies A–C arranged to supply power (e.g., 90 amps) to a load LD.

More specifically, in a preferred embodiment, the total power requirement is shared equally over time by the number of power supplies, preferably by supplying power to the load LD during mutually exclusive duty cycles. Accordingly, in the FIG. 1 embodiment having three power supplies, each of the power supplies A–C would normally supply power to the load LD only during one-third of the time (see FIG. 2A; discussed ahead). Power sharing in the present invention is advantageous in that smaller power supplies can be designed/used (as each power supply provides only a portion of a total power requirement), hot-swapping is facilitated (i.e., in emergency and/or maintenance situations where one power supply is removed, non-removed power supplies can continue to supply power to a load), and improved reliability via redundancy is gained (as non-malfunctioning power supplies can continue to supply power to the load). In a preferred embodiment the power supplies A–C are more specifically current supplies A–C conducting current sharing; however, a mainstay of the discussion will utilize the broader, more generic terms of power supplies and power sharing.

More particularly, FIG. 1 shows a power supply A outputting power to a line containing a power supply capacitor $C_A$ (10 $\mu$F), with the combination of a power supply and a power supply capacitor hereinafter being called a "power supply side". Power from the power supply side routes through a gating circuit $GT_A$, along an output line, through an inductor $L_1$ (0.1 mH) and ultimately through a load LD. A preferred gating circuit $GT_A$ utilizes an FET transistor $Q_A$ which is normally biased so as normally not to allow power to pass therethrough from a power supply side. Other types of gating circuit arrangements are possible, e.g., a selectively openable/closeable switch, a selectively openable/closeable relay.

Gating of power from the power supply side through the transistor $Q_A$ is controlled by a gating signal GS-A which is originally output from a controller circuit C, passed through a resistor R4 (4 $\Omega$), passed through a driver $DR_A$ (model MIC4426,4427/4428 family of drivers manufactured by Micrel Co.; for boosting a driving capability of such signal), delivered to a line having shunted resistor $R_1$ (50 k$\Omega$), and finally delivered to the gate G. When an appropriate gating signal is supplied to bias the transistor into conduction, power from the power supply A side flows from the drain D to the source S of the transistor $Q_A$, and ultimately to the load LD. Accordingly, by controlling a duty cycle of the gating signal GS-A, there can be controlled a duty cycle for which the power supply A side supplies power to the load LD.

With respect to the power supplied (i.e., gated) from the power supply side, such power is not solely a real-time power output from the power supply A, but instead is a combination of real-time power output from the power supply A and also power stored within the capacitor $C_A$. More particularly, during times when the gating circuit $GT_A$ is not gating power, the capacitor $C_A$ acts as a power reservoir to store a continuing real-time power output from the power supply A. In contrast, during times when the gating circuit $GT_A$ is gating power, the capacitor $C_A$ supplies stored power together with the real-time power output from the power supply A. Accordingly, since both the power supply A and the charged capacitor $C_A$ are available at gate opening to supply power upon demand to the load LD, power requirements of the power supply A are somewhat lessened allowing easier/cheaper design of the power supply A.

The combination of a power supply, power supply capacitor, resistor, driver, shunted resistor and their associated lines is hereinafter being called a "power supply branch". The FIG. 1 embodiment has three power supply branches A, B and C. While the above discussion has been made with respect to a single power supply A branch of FIG. 1, the FIG. 1 power supply B and C branches are constructed/operated in a likewise manner. Therefore, redundant discussion thereof is omitted for the sake of brevity. Accordingly, as a result of the foregoing, and with the connections illustrated in FIG. 1, it can be seen that all three power supply A, B and C sides are arranged to commonly gate power to the common load LD.

Turning next to discussion of the FIG. 1 dashed controller block CB, such controller block CB includes both a clock generator CG generating a clock signal CLK (100 kHZ), and a controller circuit C which receives such clock signal CLK. The controller C additionally receives "enabled" signals EN-A, EN-B and EN-C from the power supplies A, B and C, respectively, with information within each such signal EN-A, EN-B and EN-C being indicative of whether or not each respective power supply is "enabled" (i.e., installed and operating properly). For example, one of a high (+5 v) or low (0 v) level can be preselected during design of the FIG. 1 arrangement to be indicative of a power supply being enabled. The controller utilizes such enabled signals EN-A, EN-B and EN-C to monitor for continued installation and/or proper operation of the power supplies, and controls and outputs gating signal duty cycles accordingly so as to continuously maintain as close as 100% power as possible to the load LD at all times.

More particularly, if the enabled signals EN-A, EN-B and EN-C indicate installation and proper operation of all of the FIG. 1 power supplies A, B and C, respectively, the controller is programmed (in a microprocessor implementation) and/or hard-wired (in a hard-wired logic arrangement) to output gating signals GS-A, GS-B and GS-C having differing duty cycles, such that total power delivery is divided and share equally over time by the number of presently operative power supplies. Accordingly, in the FIG. 1 embodiment having three power supplies, the controller outputs sequential, alternating gatings signals GS-A, GS-B and GS-C, each being mutually exclusive in time and having a same-sized duty cycle. With such gating signals, power is alternately gated through the gating circuits $GT_A$, $GT_B$ and $GT_C$ in a predetermined rotation pattern such as the exemplary pattern illustrated in FIG. 2A.

More particularly, illustrated are clock cycles t=0 through t=6, each of an exemplary 0.01 msec duration. At a time t=0, the gating circuit $GT_A$ exclusively gates power from the power supply A side for one clock cycle, at a time t=1, the gating circuit $GT_B$ exclusively gates power from the power supply B side for one clock cycle, and finally, at a time t=2, the gating circuit $GT_C$ exclusively gates power from the power supply C side for one clock cycle. At a time t=3, the FIG. 1 system recycles, such that gating circuit $GT_A$ again begins gating power. Accordingly, the preferred FIG. 1 embodiment gates power supply sides in a predetermined A-B-C-A-B-C-..., rotation pattern, with each of the power supplies A–C normally supplying power to the load LD only during one-third of the time.

At this point, it is worthy to note that the present invention is not limited to such rotation pattern and/or equal power sharing distribution. For example, with proper design of the power supplies and controller, an arrangement could be designed to both provide any other predetermined regular and/or pseudo-random rotation pattern, and/or provide unequal power sharing. More specifically, FIG. 5, for example, is illustrative of a predetermined zig-zagged A-B-

Figure 5:
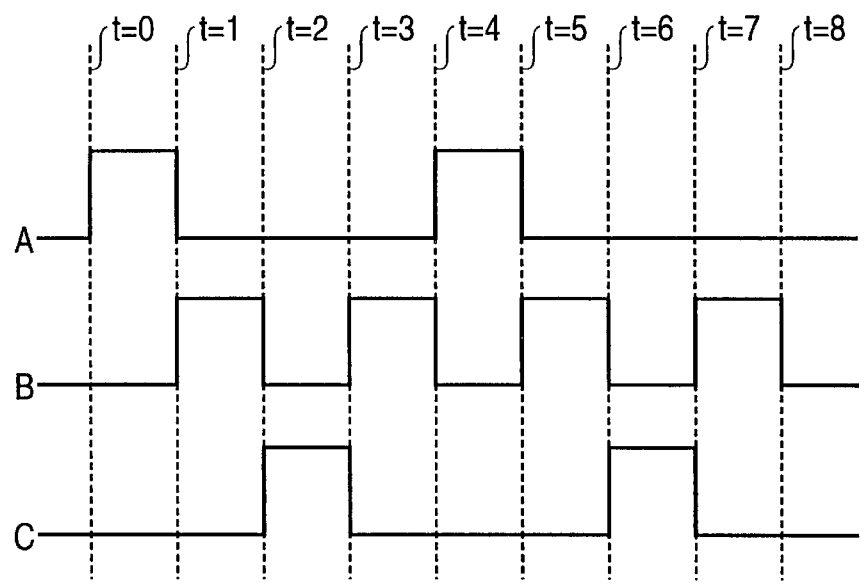
FIG. 5 is an exemplary timing diagram related to an alternative power share operation of present invention.

C-B-A-B-C-B- . . . . rotation pattern. Further, FIG. 5 is also illustrative of exemplary unequal power supplying, i.e., the power supplies A and C each supply power 25% of the time, while the power supply B supplies power 50% of the time. While such alternative embodiments are possible, an equally sharing arrangement is preferred because of a number of reasons, i.e., equally sharing power supplies will age and wear-out similarly over time, redundantly sized/designed power supplies can be economically mass produced, redundant circuit branches eases circuit design, and replacement inventory can be simplified/minimized.

Discussion now turns to a hot-swapping or emergency (i.e., failure) situation with respect to the FIG. 1 embodiment. More particularly, in FIG. 2B, assume that the power supply B is "un-enabled" (hot-swappingly removed or fails) between a time t=3 and t=4, i.e., as indicated by the "X" in FIG. 2B. Before such un-enabling, the FIG. 1 arrangement gates power supply sides in the predetermined A-B-C-A-B-C- . . . , rotation pattern previously discussed, with each of the power supplies A–C normally supplying power to the load LD only during one-third of the time. Upon un-enabling of the power supply B, the signal EN-B becomes unavailable or otherwise changes (in a predetermined manner) to be indicative of the un-enabling of the power supply B. The controller C is programmed and/or hard-wired to recognize such change, and to adjust gating signals so as to attempt to maintain supply of 100% power to the load LD continuously, i.e., both in terms of power level and substantially uninterrupted in time.

Figure 2A:
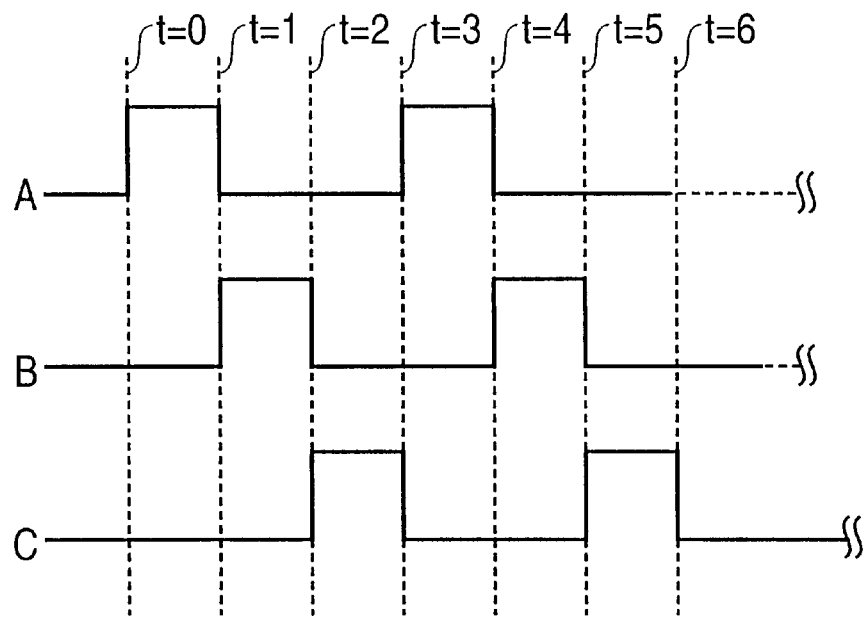
FIGS. 2A–2B are exemplary timing diagrams related to a power share operation of the present invention.

Upon recognition of un-enabling of the power supply B, the controller C effects a contingency operation by readjusting the power supplying responsibility to the remaining enabled power supplies, i.e., power supplies A and C. More particularly, the controller outputs only the gating signals GS-A and GS-C (while rendering the gating signal GS-B ineffective), such that the total power supplying responsibility is divided and shared equally by the remaining power supplies A and C over time. Accordingly, in the FIG. 1 embodiment having two remaining enabled power supplies, the controller (upon occurrence of the unenabling of power supply B) outputs sequential, alternating gatings signals GS-A and GS-C, each having a same-sized duty cycle, such that power is alternately gated through the gating circuits $GT_A$ and $GT_C$ in an exemplary predetermined A-C-A-C-A-C- . . . rotation pattern as illustrated in FIG. 2A.

The present invention is well suited toward maintaining a substantially continuous power supply during normal operation and contingency operation. More-particularly, since each individual duty cycle of each power supply A, B or C is set to be very brief (e.g., one cycle of the 100 kHz clock), even if a power supply A, B or C becomes un-enabled to interrupt a power supplying thereof exactly while it is on-line supplying power to the load LD during an operative gating cycle (e.g., if the FIG. 2B power supply B became un-enabled between times t=1 and t=2 instead of between times t=3 and t=4), interruption at the load most likely would be minor and/or go unnoticed in most loads/applications. More particularly, the controller is adapted to quickly switch gating to remaining enabled power supplies (e.g., immediately, or at occurrence/transition of a next clock pulse), and accordingly, any drop in power delivery is deminimus in time. Further, the load LD end inductor $L_1$ and capacitor $C_4$ arrangement, which normally serves to smooth a normal power sharing output delivered to the load, also serves to smooth out any minor power delivery glitches.

The above-discussed contingency operation (during hot-swapping or emergencies) also provides guidance as to proper design of the power supply sides, i.e., is indicative of the fact that the power supply sides should not be designed to be capable of supplying only normal operation power requirements, but should also be designed to be capable of supplying (greater) contingency operation power requirements (during hot-swapping or emergency situations). For example, while the three FIG. 1 power supply A–C sides each normally supply power only one-third of the time during normal operation, if power supply B side is un-enabled as discussed above, the remaining two power supply A and C sides are required to supply power for one-half of the time during contingency operation. Accordingly, the power supply sides are preferably designed to be capable of withstanding such longer periods of contingency operation, e.g., must be capable to withstand greater heat generation.

One particular consideration in power supply side design is charging of the capacitor during normal operation verses charging of the capacitor during contingency operation. More particularly, from FIG. 2B, it can be seen that during normal operation, each capacitor has two time (i.e., rest) periods to be charged before gating occurs again. That is, for capacitor $C_A$, for example, such capacitor is charged between the time periods t=1 and t=3 before gating occurs again at t=3. In contrast, during contingency operation, each capacitor only has one time period to charge before gating occurs again. That is, for capacitor $C_A$, for example, such capacitor is charged only between the time periods t=4 and t=5 before gating occurs again at t=5. The result is that if the circuit has been designed to effect capacitor charging in two time periods, there will be less power to be gated through the gating circuits $GT_A$, $GT_B$ or $GT_C$ at the time of gating. Accordingly, an output power level during contingency operation will be slightly lower that an output power level during normal operation. Such minor output power drop is typically negligible with respect to most loads/applications. However, if such drop is not negligible in a particular load/application, the circuit should be designed to effect capacitor charging within the worst case contingency operation "rest" period, e.g., the FIG. 1 circuit should be designed to effect capacitor charging within one period so as to be fully charged by each contingency operation gating and so as not to result in any output power drop.

Upon re-enabling of power supply B (e.g., via reinstallation, replacement and/or repair), the signal EN-B again becomes effective, and the controller C is programmed and/or hard-wired to recognize such change. The controller C then readjusts the gating signals such that power is again alternately gated through the gating circuits $GT_A$, $GT_B$ and $GT_C$ in the original predetermined A-B-C-A-B-C- . . . rotation pattern illustrated in FIG. 2A. Further, upon or during contingency operation, additional arrangements (not shown) can also be provided to alert a user (e.g., via visible or audible indication) of the fact of the unenablement of a power supply, i.e., to speed repair and return to normal operation.

As shown by the above discussion, even if one power supply is being hot-swapped (replaced) or fails, the load LD can continuously operate without interruption as the controller and remaining power supplies can adjust to accept more power sharing responsibility so as to continue to supply as close to 100% power as possible to the load LD substantially at all times.

Figure 3:
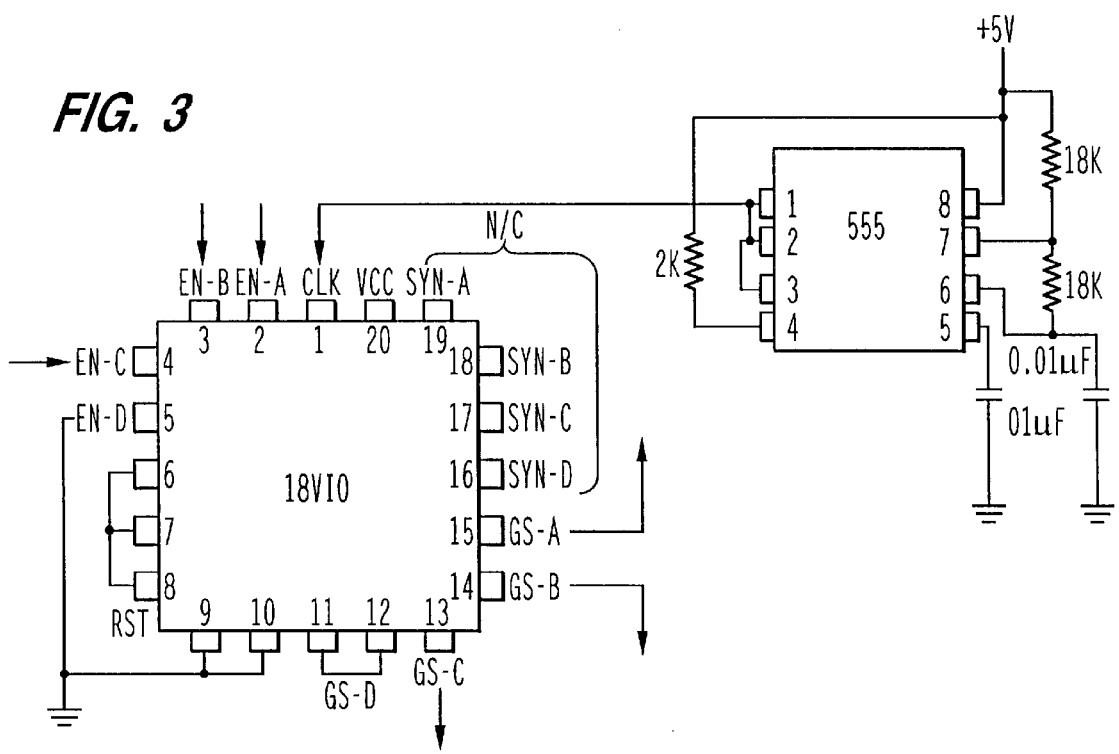
FIG. 3 is an exemplary circuit for the controller/timer arrangement of FIG. 1.

Turning next to more detailed description of several FIG. 1 components, FIG. 3 is illustrative of an exemplary circuit for the FIG. 1 controller block CB. More specifically, illustrated is a clock generator in a form of an integrated circuit (IC) timer (model 555 family of timers manufactured by Texas Instruments, Inc.) having pins 1–8 wired with supportive resistors and capacitors of the exemplary values indicated. Further illustrated is a controller IC (model GAL18V10 High Performance E$^2$CMOS PLD Generic Array Logic chip, manufactured by Lattice Semiconductor Corporation) having pin connections and inputs/outputs as indicated (with "RST" representing reset, and "N/C" representing not connected), such controller IC being adapted to operate according to the FIG. 4 exemplary state machine diagram and/or the following Boolean expression:

$$A := !D \,\&\, !C \,\&\, !B \,\&\, A \,\&\, !a \,\&\, !b \,\&\, !c \,\&\, !d \,+$$
$$!D \,\&\, !C \,\&\, B \,\&\, !A \,\&\, a \,\&\, !c \,\&\, !d \,+$$
$$!D \,\&\, C \,\&\, !B \,\&\, !A \,\&\, a \,\&\, !d \,+$$
$$D \,\&\, !C \,\&\, !B \,\&\, !A \,\&\, a \,+$$
$$RST;$$

$$B := !D \,\&\, !C \,\&\, !B \,\&\, A \,\&\, !b \,\&\, !RST \,+$$
$$!D \,\&\, !C \,\&\, B \,\&\, !A \,\&\, !a \,\&\, !b \,\&\, !c \,\&\, !d \,\&\, !RST \,+$$
$$!D \,\&\, C \,\&\, !B \,\&\, !A \,\&\, !a \,\&\, b \,\&\, !d \,\&\, !RST \,+$$
$$D \,\&\, !C \,\&\, !B \,\&\, !A \,\&\, !a \,\&\, b \,\&\, !RST;$$

$$C := !D \,\&\, !C \,\&\, !B \,\&\, A \,\&\, !b \,\&\, c \,\&\, !RST \,+$$
$$!D \,\&\, !C \,\&\, B \,\&\, !A \,\&\, !c \,\&\, !RST \,+$$
$$!D \,\&\, C \,\&\, !B \,\&\, !A \,\&\, !a \,\&\, !b \,\&\, !c \,\&\, !d \,\&\, !RST \,+$$
$$D \,\&\, !C \,\&\, !B \,\&\, !A \,\&\, !a \,\&\, !b \,\&\, c \,\&\, !RST;$$

$$D := !D \,\&\, !C \,\&\, !B \,\&\, A \,\&\, !b \,\&\, !c \,\&\, d \,\&\, !RST \,+$$
$$!D \,\&\, !C \,\&\, B \,\&\, !A \,\&\, !c \,\&\, !d \,\&\, !RST \,+$$
$$!D \,\&\, C \,\&\, !B \,\&\, !A \,\&\, !d \,\&\, !RST \,+$$
$$D \,\&\, !C \,\&\, !B \,\&\, !A \,\&\, !a \,\&\, !b \,\&\, !c \,\&\, !d \,\&\, !RST;$$

Figure 4:
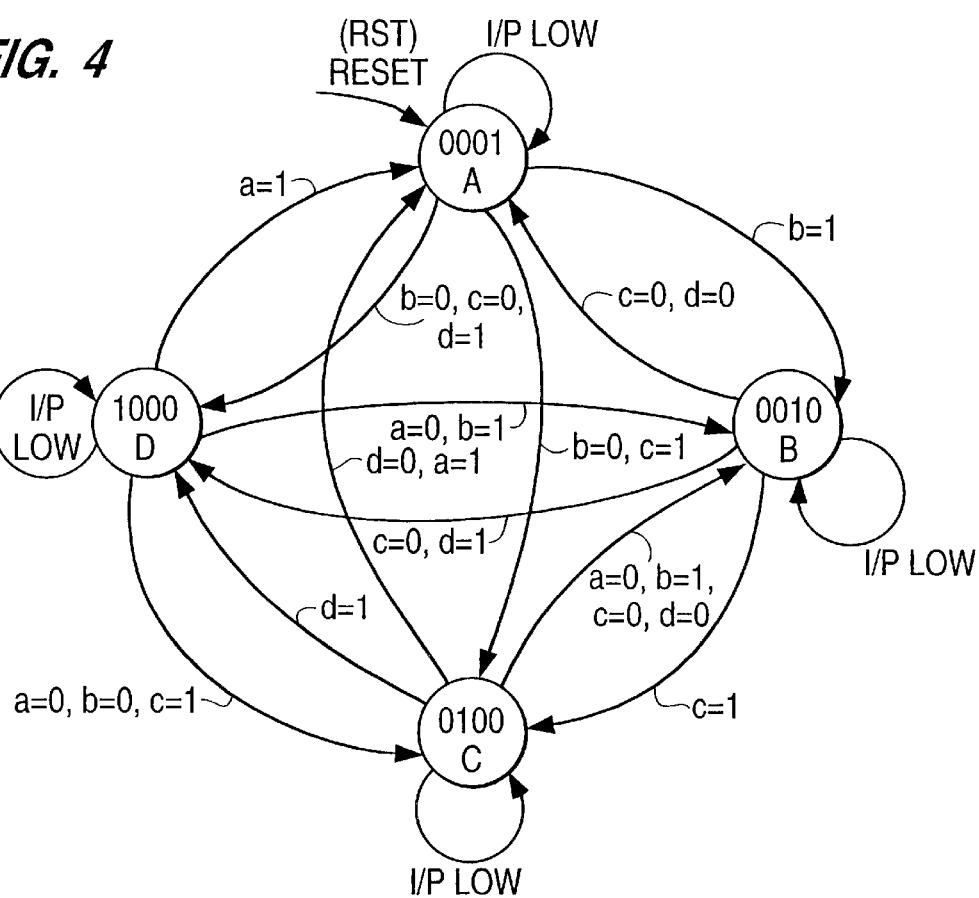
FIG. 4 is an exemplary state machine diagram applicable to the arrangement of FIG. 1.

Of particular interest, while the preferred FIG. 1 embodiment has been illustrated and described to have only three power supplies (i.e., A, B and C), the above Boolean equation and FIG. 4 are actually configured to versatilely provide control for up to four power supplies (i.e., A, B, C and D). However, in the discussions to follow, the power supply D will be assumed to be un-enabled (i.e., not installed), so as to match the FIGS. 3 and 4 discussions with the FIG. 1 illustrated three power supply arrangement, i.e., the EN-D input to the FIG. 3 controller IC will be assumed to be locked low or d=0.

More particularly, turning now to description of the FIG. 3 controller IC in conjunction with the FIG. 4 state machine diagram and the preferred embodiment of FIG. 1, initialization via appropriate input to the controller IC pins 6–8 causes the controller IC to initialize (see FIG. 4 "Reset" arrow) to the circled "0001 A" state so as to first operate to gate power from the power supply A side. If, upon a next checking, all the inputs (EN-A, EN-B, EN-C and EN-D) are low, the controller IC locks (see FIG. 4's top "I/P low" arrow) to the circled "0001 A" state so as to continue to operate to gate power from the power supply A side only. In fact, locking of all the inputs (EN-A, EN-B, EN-C and EN-D) to low at any given time, will cause the controller IC to lock to a current "0001 A", "0010 B", "0100 C" or "1000 D" state so as to continue to operate to gate power from a corresponding power supply A, B, C, or D side, respectively (i.e., see any of the FIG. 4's "I/P low" arrows associated with any of the "0001 A", "0010 B", "0100 C" or "1000 D" states). The controller IC will stay locked to the current "0001 A", "0010 B", "0100 C" or "1000 D" state until at least one of the inputs EN-A, EN-B, EN-C and EN-D is released. Such locking function is advantageous in some situations, e.g., locking power output to a particular power supply so as to test such power supply on-line.

In continuing discussion of a normal unlocked operation, first there will be discussed a situation like FIGS. 1 and 2A, wherein the power sharing arrangement is working properly, i.e., all power supplies are fully enabled. More particularly, after initialization and initial operation in the circled "0001A" state and gating of power from the power supply A side (see t=0 in FIG. 2A), if upon a next predetermined checking cycle, all the inputs EN-A, EN-B, EN-C indicate that the all power supplies A, B and C are enabled, the controller IC switches (see FIG. 4 "b=1" arrow) to the circled "0010 B" state so as to operate to then gate power from the power supply B side (see t=1 in FIG. 2A). If upon a next checking cycle, all the inputs EN-A, EN-B, EN-C again indicate that the power supplies A, B and C are enabled, the controller IC switches (see FIG. 4 "C=1" arrow) to the circled "0100 C" state so as to operate to next gate power from the power supply C side (see t=2 in FIG. 2A). Finally, if upon next checking, all the inputs EN-A, EN-B, EN-C indicate that the power supplies A, B and C are still enabled, the controller IC returns (see FIG. 4 "d=0, a=1" arrow) to the circled "0001 A" state so as to again operate to gate power from the power supply A side (see t=3 in FIG. 2A). As long as all of the inputs EN-A, EN-B, EN-C indicate that the power supplies A, B and C are enabled, the controller continues to operate to effect the above A-B-C-A-B-C- . . . rotation pattern.

Figure 2B:
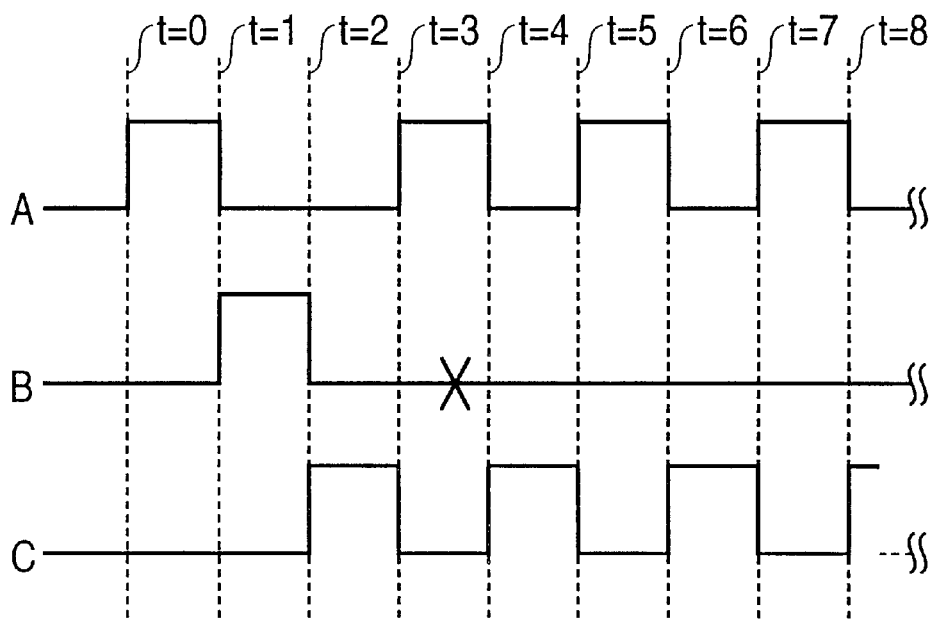

Next, there will be discussed a situation like FIGS. 1 and 2B, wherein the power sharing arrangement is not working properly, i.e., has encountered an un-enablement. More particularly, the initial checking cycles up until a time t=3 operate exactly as indicated above with respect to FIG. 2A. If operating in the circled "0001 A" state and gating of power from the power supply A side (t=3 in FIG. 2B), and upon a next checking the inputs EN-A and EN-C indicate that the power supplies A and C are enabled, while the input EN-B indicates that the power supply B is un-enabled, the controller IC switches (see FIG. 4 "b=0, c=1" arrow) to the circled "0100 C" state so as to operate to gate power from the power supply C side (t=4 in FIG. 2B) instead of the normal operation to next gate power from the power supply B side. Finally, if upon next checking, all the inputs EN-A, EN-B, EN-C remain the same, the controller IC returns (see FIG. 4 "d=0, a=1" arrow) to the circled "0001 A" state so as to again operate to gate power from the power supply A side (t=5 in FIG. 2B). As long as the inputs EN-A and EN-C indicate that the power supplies A and C are enabled, while the input EN-B indicates that the power supply B is un-enabled, the controller continues to operate to effect the A-C-A-C- . . . rotation pattern.

Discussion of further power supply switching situations with the FIG. 4 state machine diagram is omitted for sake of brevity, as understanding of any other power supply switching situation and/or operation with four power supplies can be interpolated from the above state machine discussions and further review and understanding of the FIG. 4 state machine diagram.

Figure 7:
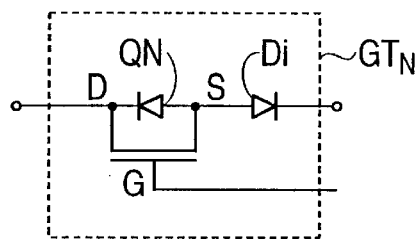
FIG. 7 is an exemplary alternative circuit for the gating circuit illustrated with respect to the embodiment of FIG. 1.

Several additional discussions are appropriate. More particularly, an alternative gating circuit is available which adds additional short circuit protection to the embodiment of FIG. 1. More particularly, the FIG. 1 embodiment involves some risk of mal-operation, in that, if one of the power supply A, B or C sides develops any level of internal short circuiting, then at least some power from a different normally operating and gated power supply will back-flow to the short-circuit (instead of to the load LD) through the gating circuit of the short-circuited power supply. If a small amount of power back-flows, at minimum, a level of power delivered to the load LD will be degraded. If a substantial amount of power back-flows, there are risks of total loss of power to the load LD, circuit damage to other circuit components, and/or fire. Accordingly, as another preferred embodiment, the alternative exemplary FIG. 7 gating circuit $GT_N$ can be substituted for the FIG. 1 gating circuits $GT_A$, $GT_B$ and $GT_C$. More specifically, such FIG. 7 gating circuit $GT_N$ further includes a diode Di for preventing back-flow of power into a power supply side. Alternative back-flow preventing components would include a selectively opened/closed switch or relay to provide circuit interruption during appropriate (e.g., non-gated) times. While the FIG. 7 gating circuit does provide additional protection, since power supply sides mainly fail in an open-circuited fashion and short-circuiting rarely occurs, the additional component and manufacturing costs of the FIG. 7 arrangement may not be cost effective for many implementations.

Figure 6:
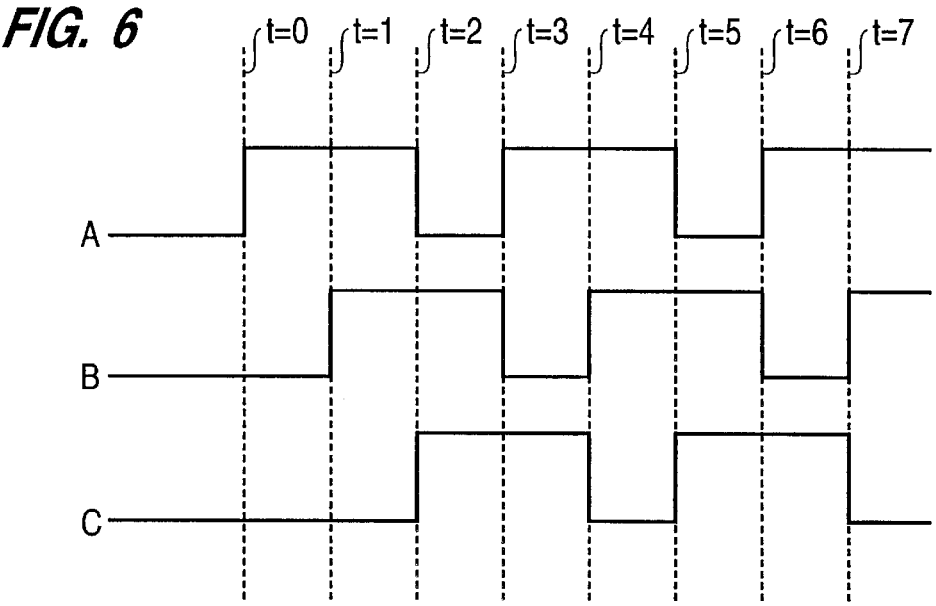
FIG. 6 is an exemplary timing diagram related to another alternative power share operation of present invention.

As a next discussion, while the above arrangements have been discussed as providing gating of differing power supply sides during mutually exclusive times (see, e.g., FIG. 2A), the present invention is not limited to such arrangements. More specifically, the present invention also encompasses arrangements wherein differing power supply sides are overlappingly gated in time, e.g., gated so as to partially overlap. That is, FIG. 6 illustrates an exemplary timing arrangement wherein a power supply side A is overlappingly gated with power supply side B between time t=1 and t=2, a power supply side B is overlappingly gated with power supply side C between time t=2 and t=3, a power supply side C is overlappingly gated with power supply side A between time t=3 and t=4, etc. Accordingly, the FIG. 6 embodiment gates power supply sides in a predetermined A-AB-BC-CA-AB-BC-AC- . . . , rotation pattern, with each of the power supplies A–C normally supplying power to the load LD for more than one-third of the time. Despite the discussion of this paragraph, an overlappingly gated arrangement requires increased complexity both in design of the controller block CB and in avoiding conflicts between concurrently gated power supplies, and accordingly, the simpler arrangement of gating differing power supply sides during mutually exclusive times is preferred.

As yet further discussion, while in the above arrangements a length (i.e., duration) of each individual duty cycle period was substantially identical (e.g., 0.01 msec) for both normal operation and contingency operations, the present invention is not limited to such arrangements. More specifically, the present invention also encompasses arrangements wherein differing lengths (i.e., durations) of duty cycle periods can be given to a normal operation verses a contingency operation. That is, the power supply sides can be gated with a 0.01 msec duty cycle period during times of normal operation (resulting in a 3×0.01 msec=0.03 msec total period for one A-B-C power supply rotation), while remaining enabled power supplies can be gated with an increased or 0.015 msec duty cycle period during times of contingency operation (similarly resulting in a 2×0.01 msec=0.03 msec total period for one A–C power supply rotation). Despite the discussion of this paragraph, an adjusting duty cycle period arrangement requires increased complexity in design of the controller block CB, and accordingly, the simpler arrangement of consistent duty cycle periods for both normal and contingency operations is preferred.

Figure 8:
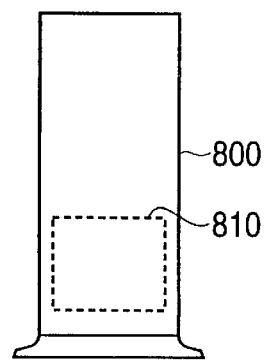
FIG. 8 is illustrative of an exemplary computer server system including a power sharing arrangement.

As closing notes, the present invention is not limited to three power supplies or even four power supplies, but instead, any number of power supplies can be used. Further, the present invention is useable in a multitude of differing environments, e.g., such power sharing arrangement is particularly suited as a reliable power supply for computer servers, security monitoring equipment, aircraft/spacecraft power supplies, etc. FIG. 8 is illustrative of a computer server system 800 including a power sharing arrangement 810 (e.g., configured like the FIG. 1 embodiment).

This concludes the description of the preferred embodiments. Although the present invention has been described with reference to a number of illustrative embodiments thereof, it should be understood that numerous other modifications and embodiments can be devised by those skilled in the art having the benefit of this invention that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses and/or environments will also be apparent to those skilled in the art.

What is claimed is:

1. A power share distribution system comprising:

a plurality of power supplies;

an isolator provided for each power supply of said plurality of power supplies for selectively blocking/passing an output power from said power supply; and a controller controlling each said isolator for passing an output power of each said power supply for a predetermined time, such that different groups of said plurality of power supplies supply output power to a load at different times;

wherein said controller at least periodically monitors real-time enablement of said each power supply of said plurality of power supplies during continued operation of said plurality of power supplies, and upon detection of disablement, controls passage of said output power of said each power supply such that total power delivery by said power share distribution system is divided and shared substantially equally over time by a sub-plurality of presently operative said power supplies.

2. A power share distribution system as claimed in claim 1, wherein said controller more specifically passes said output power of said each power supply such that each said power supply supplies power to said load for mutually exclusive times.

3. A power share distribution system as claimed in claim 1, wherein said controller more specifically passes said output power of said each power supply such that different sub-pluralities of said power supplies supply power to said load for mutually exclusive times.

4. A power share distribution system as claimed in claim 1, wherein said controller more specifically causes supplying of said output power from a different said power supply upon each occurrence of a predetermined unit of time and according to one of a predetermined and a pseudo-random pattern, so as to rotate power supplying through a number of presently operative said power supplies.

5. A power share distribution system as claimed in claim 1, further comprising a capacitor provided between each respective said power supply and associated said isolator, wherein during times when said isolator is blocking, said capacitor acts as a power reservoir to store a continuing real-time power output from said power supply, and wherein during times when said isolator is passing, said capacitor supplies stored power together with the real-time power output from said power supply.

6. A power share distribution system as claimed in claim 1, wherein said isolator is more specifically an isolation transistor normally biased so as normally not to allow power to pass therethrough from said power supply, and receiving intermittent gating signals for selectively gating said output power from said power supply.

7. A power share distribution system as claimed in claim 1, wherein said isolator comprises a back-flow preventing component for preventing said output power from a first said power supply from back-flowing to a second said power supply.

8. A power share distribution system as claimed in claim 7, wherein said back-flow preventing component is more specifically at least one of: a selectively openable/closeable switch; a selectively openable/closeable relay; and, a reversed-biased diode.

9. A power share distribution system as claimed in claim 1, wherein said controller is more specifically at least one of: a programmed microprocessor; and, a hard-wired logic arrangement.

10. A current share distribution system comprising:
   a plurality of current supplies;
   an isolator provided for each current supply of said plurality of current supplies for selectively blocking/passing an output current from said current supply; and
   a controller controlling each said isolator for passing an output current of each said current supply for a predetermined time, such that different groups of said plurality of current supplies supply output current to a load at different times;
   wherein said controller at least periodically monitors real-time enablement of said each current supply of said plurality of current supplies during continued operation of said plurality of current supplies, and upon detection of disablement controls passage of said output current of said each current supply such that total current delivery by said current share distribution system is divided and shared substantially equally over time by a sub-plurality of presently operative said current supplies.

11. A current share distribution system as claimed in claim 10, wherein said controller more specifically passes said output current of said each current supply such that each said current supply supplies current to said load for mutually exclusive times.

12. A current share distribution system as claimed in claim 10, wherein said controller more specifically passes said output current of said each current supply such that different sub-pluralities of said current supplies supply current to said load for mutually exclusive times.

13. A current share distribution system as claimed in claim 10, wherein said controller more specifically causes supplying of said output current from a different said current supply upon each occurrence of a predetermined unit of time and according to one of a predetermined and a pseudo-random pattern, so as to rotate current supplying through a number of presently operative said current supplies.

14. A current share distribution system as claimed in claim 10, further comprising a capacitor provided between each respective said current supply and associated said isolator, wherein during times when said isolator is blocking, said capacitor acts as a power reservoir to store a continuing real-time current output from said current supply, and wherein during times when said isolator is passing, said capacitor supplies stored current together with the real-time current output from said current supply.

15. A current share distribution system as claimed in claim 10, wherein said isolator is more specifically an isolation transistor normally biased so as normally not to allow current to pass therethrough from said current supply, and receiving intermittent gating signals for selectively gating said output current from said current supply.

16. A current share distribution system as claimed in claim 10, wherein said isolator comprises a back-flow preventing component for preventing said output current from a first said current supply from back-flowing to a second said current supply.

17. A current share distribution system as claimed in claim 16, wherein said back-flow preventing component is more specifically at least one of: a selectively openable/closeable switch; a selectively openable/closeable relay; and, a reversed-biased diode.

18. A current share distribution system as claimed in claim 10, wherein said controller is more specifically at least one of: a programmed microprocessor; and, a hard-wired logic arrangement.

19. A current share distribution system comprising:
   at least three current supplies;
   an isolator provided for each current supply of said at least three current supplies for selectively blocking/passing an output current from said current supply; and
   a controller controlling each said isolator for passing an output current of each said current supply for a predetermined time, such that different groups of said at least three current supplies supply output current to a load at different times, wherein said controller at least periodically monitors real-time enablement of each said current supply of said at least three current supplies during continued operation of said plurality of current supplies, and upon detection of disablement, controls passage of said output current of each said current supply such that total current delivery by said current share distribution system is divided and shared substantially equally over time by a sub-plurality of presently operative said at least three current supplies.

20. A computer server system including a current share distribution system, said current share distribution system comprising:
   at least three current supplies;
   an isolator provided for each current supply of said at least three current supplies for selectively blocking/passing an output current from said current supply; and
   a controller controlling each said isolator for passing an output current of each said current supply for a predetermined time, such that different groups of said at least three current supplies supply output current to a load at different times, wherein said controller at least periodically monitors real-time enablement of each said current supply of said at least three current supplies during continued operation of said at least three current supplies, and upon detection of disablement, controls passage of said output current of each said current supply such that total current delivery by said current share distribution system is divided and shared substantially equally over time by a sub-plurality of presently operative said at least three current supplies.

21. A power share distribution method comprising the steps of:

outputting power from a plurality of power supplies;

providing an isolator for each power supply of said plurality of power supplies for selectively blocking/passing said power from said power supply; and controlling each said isolator for passing an output power of each said power supply for a predetermined time, such that different groups of said plurality of power supplies supply output power to a load at different times;

wherein said controlling at least periodically monitors real-time enablement of said each power supply of said plurality of power supplies during continued operation of said plurality of power supplies, and upon detection of disablement controls passage of said output power of said each power supply such that total power delivery by a power share distribution system is divided and shared substantially equally over time by a sub-plurality of presently operative said power supplies.

22. A power share distribution system comprising:

a plurality of power supplies;

an isolator provided for each power supply of said plurality of power supplies for selectively blocking/passing an output power from said power supply; and a controller controlling each said isolator for passing an output power of each said power supply for a predetermined time, such that different groups of said plurality of power supplies supply output power to a load at different times;

wherein said controller at least periodically monitors real-time enablement of said each power supply of said plurality of power supplies during continued operation of said plurality of power supplies, and upon detection of disablement, controls passage of said output power of said each power supply such that total power delivery by said power share distribution system is divided and shared over time by a sub-plurality of presently operative said power supplies.

* * * * *